United States Patent [19]
Olsson

[11] 3,914,845
[45] Oct. 28, 1975

[54] DEVICE FOR JOINING PARTS TOGETHER
[76] Inventor: Lars Olsson, Kyrkogatan 61 A, S-671 00 Arvika, Sweden
[22] Filed: Aug. 27, 1974
[21] Appl. No.: 501,080

[30] Foreign Application Priority Data
Dec. 6, 1973  Sweden............................ 16452/73

[52] U.S. Cl............................. 29/243.5; 140/93.2
[51] Int. Cl.² ........................................ B23P 11/00
[58] Field of Search.................. 29/243.5; 140/93.2; 227/83, 108, 68, 155

[56] References Cited
UNITED STATES PATENTS
| | | | |
|---|---|---|---|
| 1,796,572 | 3/1931 | Matveyeff | 227/155 |
| 1,852,060 | 4/1932 | Peterson | 227/155 |
| 2,854,874 | 10/1958 | Decker | 29/243.5 |
| 3,010,199 | 11/1961 | Smith et al. | 29/509 |
| 3,438,119 | 4/1969 | Moltchan | 29/509 |

Primary Examiner—James L. Jones, Jr.
Attorney, Agent, or Firm—Stewart and Kolasch

[57] ABSTRACT

A device for joining at least two bodies together wherein said bodies are placed together, adjacent to each other, flaps are punched out of said bodies and said flaps are folded against each other and against said bodies. The device of the present invention is light in weight and can be operated by a single person.

3 Claims, 10 Drawing Figures

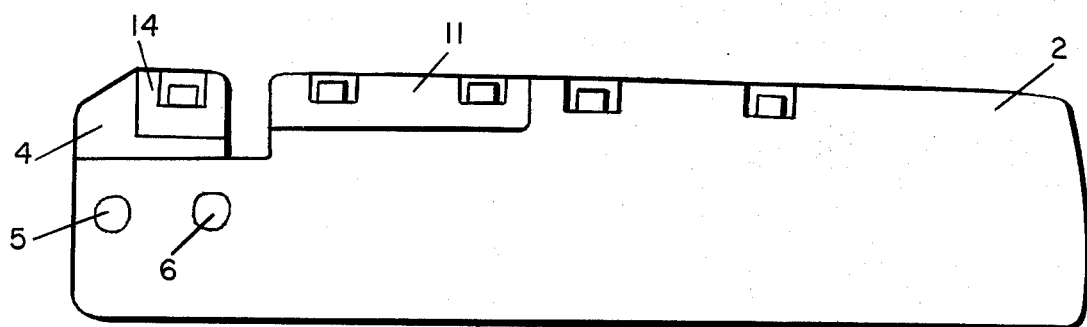
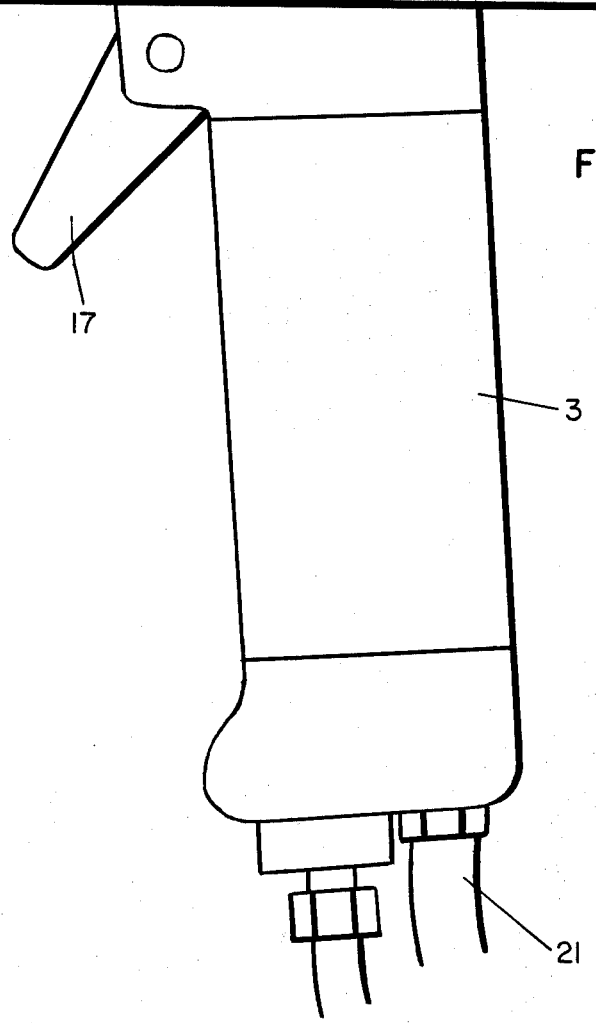
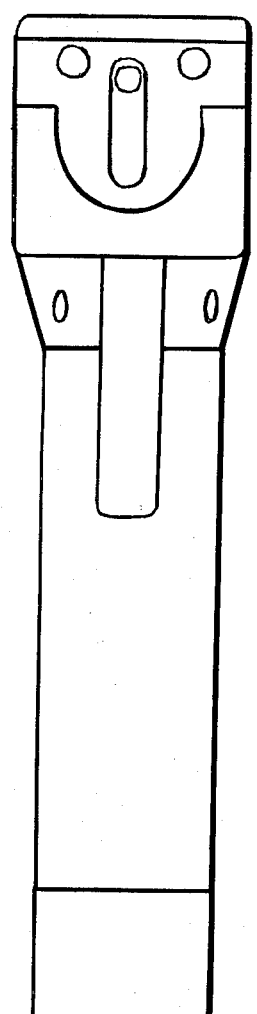
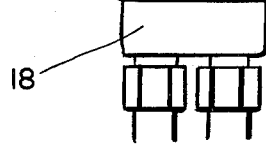
FIG. 1
FIG. 2

DEVICE FOR JOINING PARTS TOGETHER

One object of the present invention is to produce a device for joining e.g., thin metal sheets together.

The joining method, on which the operation of the device is based, comprises briefly the steps of placing the bodies to be joined together adjacent each other, punching flaps out of the bodies and folding the flaps against each other and the bodies. This method is well known, but conventional devices, for example according to the U.S. Pat. spec. No. 3,010,199 or 3,438,119, which operate according to said method, are not suitable for use in all cases, among other reasons because of their weight and design.

It is, therefore, one object of the present invention to produce a light-weight and inexpensive tool, which operates after the aforesaid method and can be attended to by one person.

Figure 3:
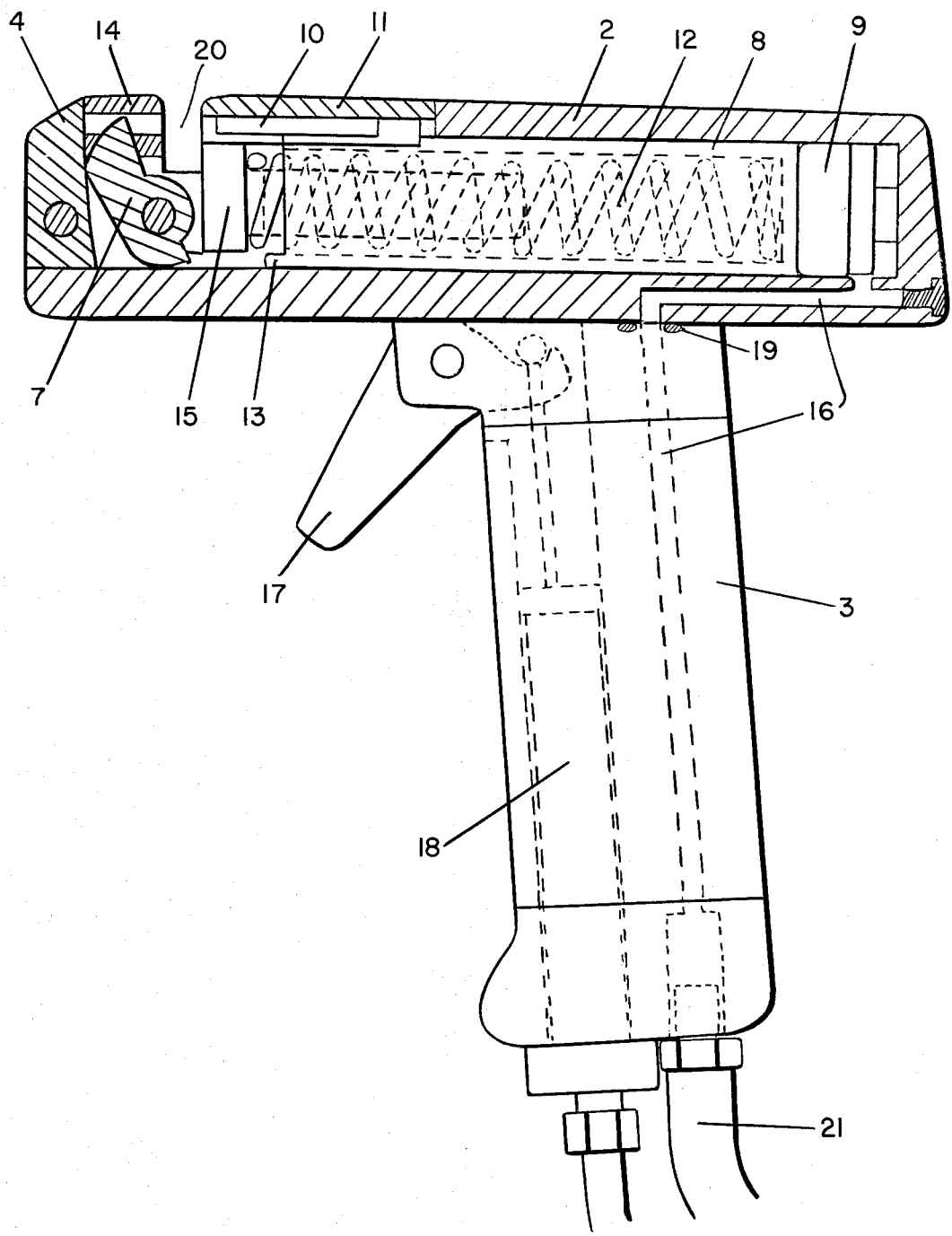
Figure 4:
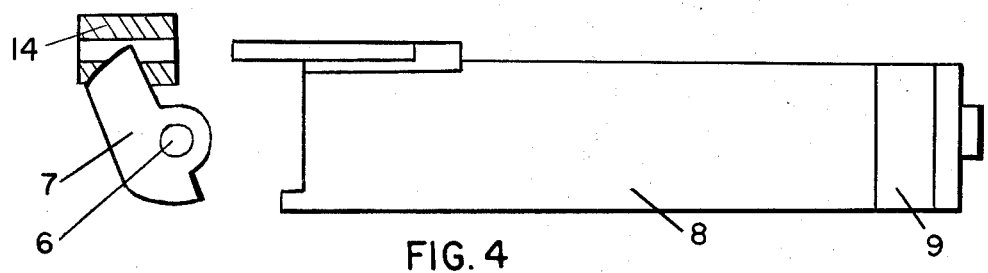
Figure 5:
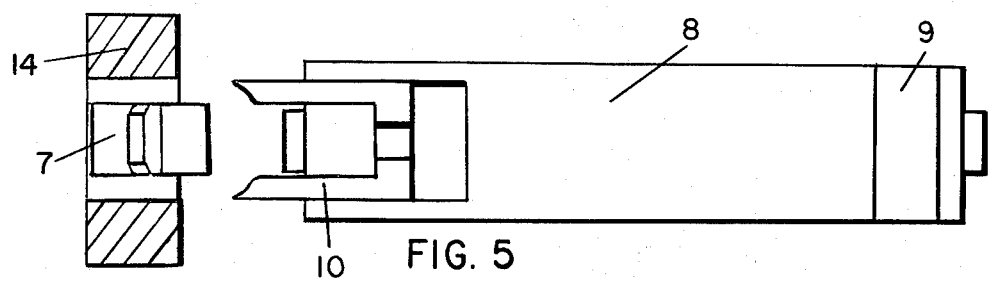
Figure 6:
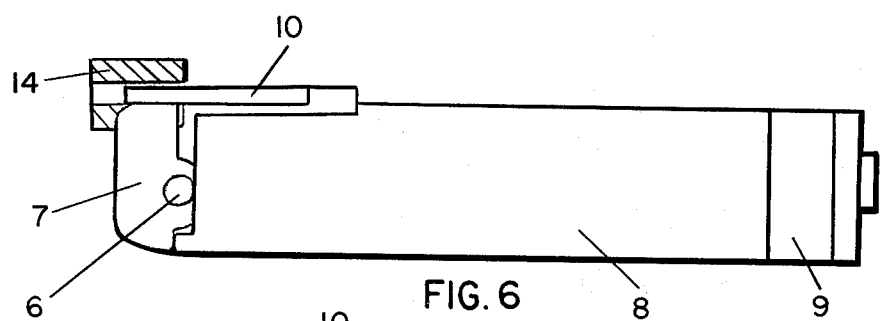
Figure 7:
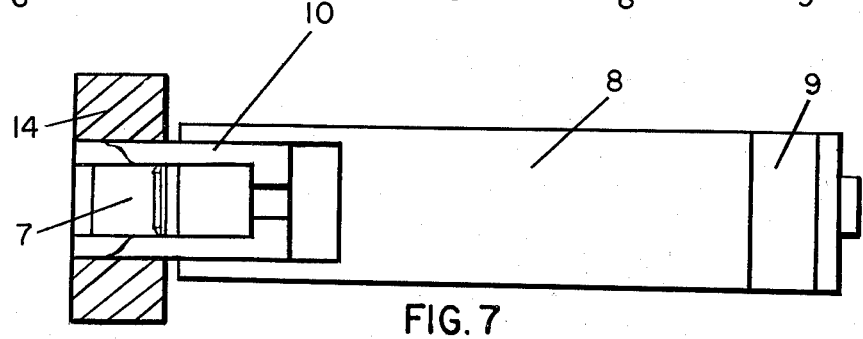
Figure 8:
Figure 9:
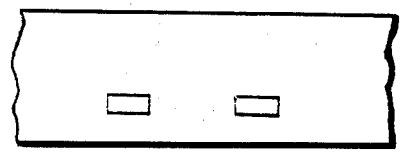
Figure 10:

One embodiment of the invention is described with reference to the drawings, in which FIGS. 1 and 2 show devices in a lateral and, respectively, front view, FIG. 3 is a section through the device seen from the side, FIGS. 4 and 5 show parts of the device, partially in section, seen from the side and, respectively, above when the piston is in retracted position, FIGS. 6 and 7 show parts of the device, partially in section, seen from the side and, respectively, above when the piston is in the final phase of its forward movement, FIG. 8 shows the punching die seen from the piston, and FIGS. 9 and 10 show a front and, respectively, lateral view of two metal sheets joined together by the device according to the invention.

The device comprises a casing 2 and a handle 3. In the front end portion of the casing an end-piece 4 is provided and retained by a split pin 5. Onto the rear portion of the end-piece a punching die 14 is screwn. A pivotal dolly 7 is supported on an axle 6 in the rear lower portion of the end-piece.

The casing 2 includes a cylindric hole, and a piston 8 movable in said hole is provided at its rear end with a high-pressure packing 9 for oil. In said piston a return spring 12 for the piston movement is mounted. A rod member 15 serves as a guide means for the return spring.

The forward upper portion of the piston includes milled grooves, in which two cutters 10 are loosely disposed. A guide cover 11 retains the cutters in place and permits their easy exchange. On the forward lower portion of the piston a projecting lip 13 is provided to actuate the pivotal dolly.

In the casing and handle a passageway 16 for hydraulic liquid is provided. The sealing between the handle and casing is effected by means of an O-ring 19. A hydraulic hose 21 is connected to a pressure booster, which is controlled by a means 18 which is in connection with a trigger 17 on the handle.

When, for example, two thin metal sheets are to be joined together by rivets, the sheets are inserted into the open gap 20 between the rear edge of the punching die 14 and the front edge of the guide cover 11. The piston 8, cutters 10 and dolly 7 are substantially in the positions shown in FIGS. 3–5. The trigger is thereafter retracted, and thereby the pressure booster presses hydraulic oil through the passageway 16 to the space behind the high-pressure packing 9 of the piston 8. The piston then performs a forward movement, during which the cutters penetrate through the metal sheets and thereby cut and form two flaps projecting from each sheet. The cutters, for bringing about this effect, are shaped so as most clearly is apparent from FIG. 5. The flaps are folded against the metal sheets thereby that the piston in the final phase of its movement actuates via the projecting lip 13 the lower portion of the dolly. The upper portion of the dolly is thereby pivoted upwards against the flaps and thereby folds them against the metal sheets. The positions of the piston 8, cutters 10 and dolly 7 at this moment are substantially as shown in FIGS. 6 and 7.

Upon releasing the trigger, the pressure in the hydraulic liquid decreases, and the return spring retracts the piston to its starting position. During this movement the riveted metal sheets are stripped off the cutters by the front edge of the guide cover.

The invention, of course, is not restricted to the embodiment described, but variations can be made within the scope of the invention with respect, for example, to the shape and number of punches, dollies and punching dies etc. Also other mechanisms for the transfer of power and movements can be imagined.

What I claim is:

1. A device for joining together at least two bodies each having a disc-like zone, characterized in that it comprises a movable piston for displacing at least two punches to punch at least two flaps out of each said zone, and at least one movable dolly to fold the punched-out flaps against said zones, and that the piston includes a portion for co-operation with said dolly to bring about a rotary moment on said dolly in conjunction with said folding of the punched-out flaps.

2. A device according to claim 1, characterized in that said dolly is suspended on and rotatable about an axle, which is oriented substantially perpendicularly to the direction of motion of the piston at the punching operation.

3. A device according to claim 1, characterized in that the forward upper portion of the piston includes milled grooves for loosely framing the cutters, which are retained in place by a guide cover.

* * * * *